Dec. 31, 1957  J. G. JOHNSTON  2,818,122
JET POWERED ADJUSTABLE PITCH HELICOPTER ROTOR
Filed March 2, 1955  2 Sheets-Sheet 1
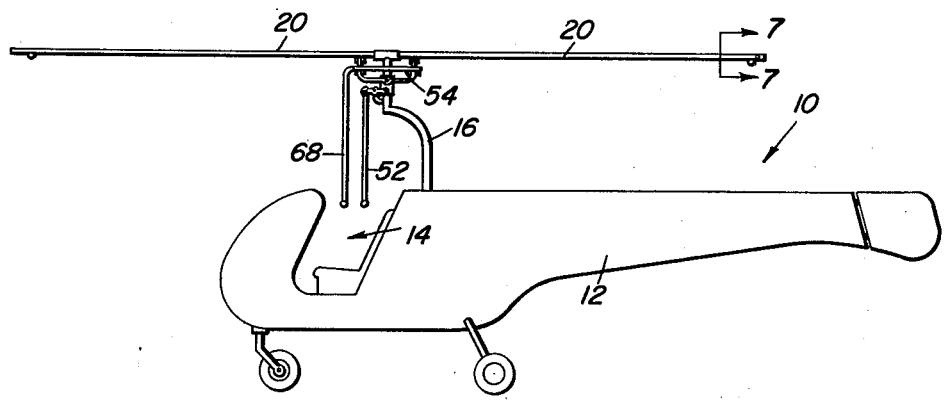
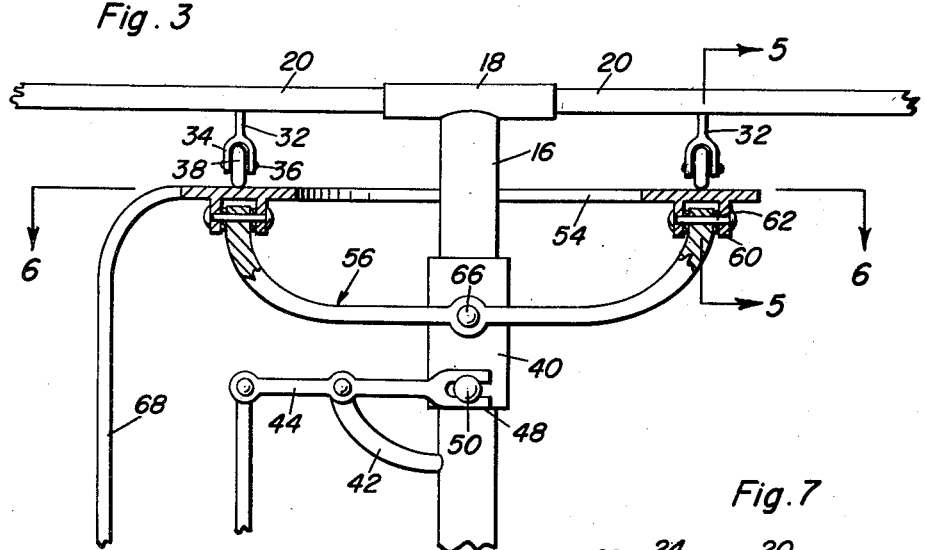
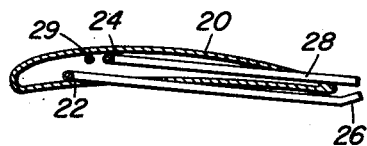
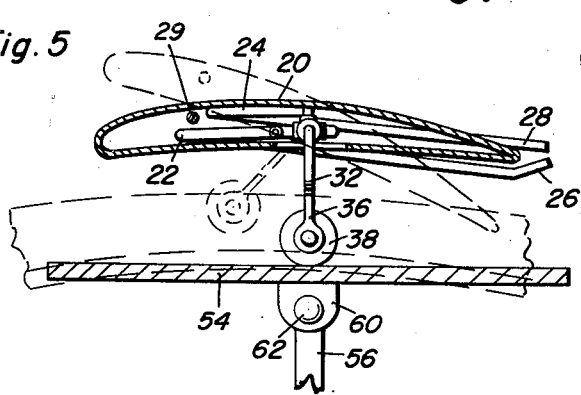
John G. Johnston
INVENTOR.

Dec. 31, 1957  J. G. JOHNSTON  2,818,122
JET POWERED ADJUSTABLE PITCH HELICOPTER ROTOR
Filed March 2, 1955  2 Sheets-Sheet 2
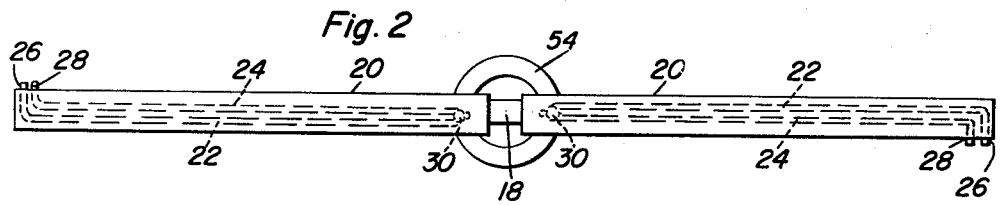
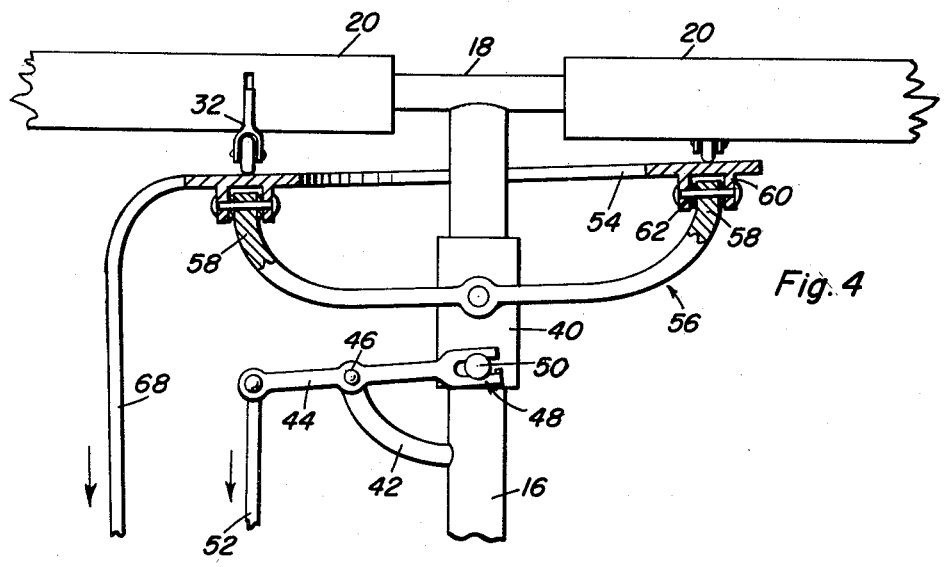
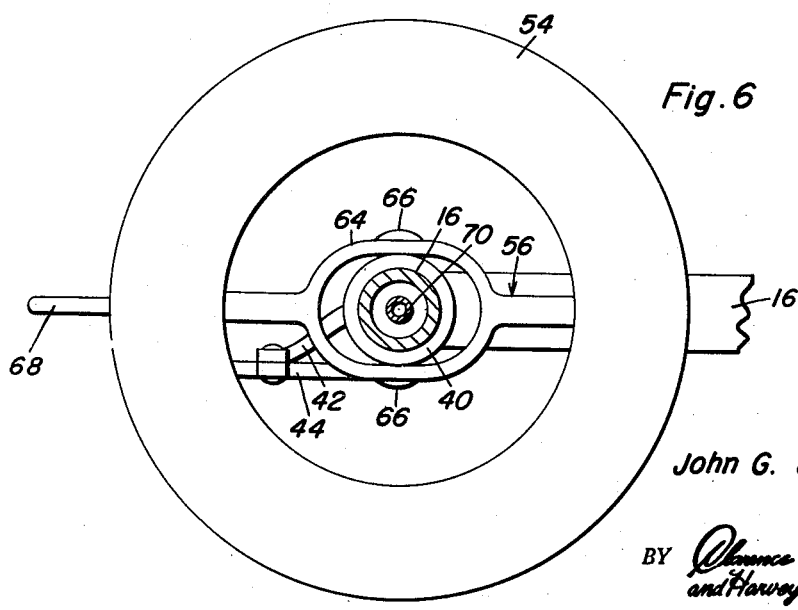
John G. Johnston
INVENTOR.

United States Patent Office 2,818,122
Patented Dec. 31, 1957

2,818,122

JET POWERED ADJUSTABLE PITCH HELICOPTER ROTOR

John G. Johnston, Palmdale, Calif.

Application March 2, 1955, Serial No. 491,614

14 Claims. (Cl. 170—135.4)

The present invention relates to helicopters and more particularly relates to an apparatus for controlling a helicopter in flight.

Basically, the helicopter of the present invention consists of a fuselage with a center post rising therefrom with a pair of helicopter blades extending radially outward from the center post at the upper end thereof and revolving about the center post by means of the propulsion effect gained by jet streams emanating from the trailing edges of the blades.

In accordance with the present invention, each of the blades is provided with a pair of jet tubes projecting rearwardly from the trailing edge adjacent the outer end thereof for driving the blade. The blades are mounted on the center post for limited rotational movement about their own axes and one of the jet tubes of each blade is angled upwardly from the trailing edge of the blade whereby passage of fluid therethrough will rotate the blade in a clockwise direction about its axis to selectively elevate and to turn the helicopter.

An object of the invention is to provide an apparatus for controlling the passage of fluid through the jet tubes in the blades thereby controlling the forward, sideward, backward and upward movement of the helicopter by simultaneously and selectively independently controlling the passage of fluid through each or both of the jet tubes of each blade and further to simultaneously control the passage of fluid through the jet tubes in both blades as necessary.

Another object of the invention is to provide a valve control means for controlling the passage of fluid through the jet tubes in the helicopter blades which control means consists of a simple operating assembly mounted on the helicopter center post engaging the valve operators for the jet tubes in all of the helicopter blades and operable from the helicopter cabin or cock-pit to control the flight of the helicopter through the operation of the jet tube valve means.

A further object of this invention is to provide a helicopter rotor blade with a pitch control assembly that involves a jet tube carried by the blade and discharging rearwardly of the blade at an angle to the chord plane of the blade, whereby a twisting force is provided in the blade in response to issuance of fluid under pressure from the jet tube. This twisting force is used for the control of the pitch of the blade and the magnitude of the force and the duration of the force is capable of being controlled by controlling the issuance of fluid from the jet tube.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of a helicopter equipped with the blades and blade control means of the present invention;

Figure 2 is a top view of the rotor blades of the helicopter;

Figure 3 is a side elevational view of the control means for varying the pitch thereof mounted on the center post with a portion of the control means being shown in cross section for clarity of detail;

Figure 4 is a view similar to Figure 3 disclosing the control means in a second position;

Figure 5 is a cross sectional view taken substantially along the plane of section line 5—5 of Figure 3 disclosing the operation of the control means to tilt one of the blades in phantom outline;

Figure 6 is a cross sectional view taken substantially along the plane of section line 6—6 of Figure 3; and Figure 7 is a cross sectional view through one of the blades adjacent the outer end thereof taken substantially along the plane of section line 7—7 of Figure 1.

Referring now to the drawings in detail, there is shown in Figure 1 a helicopter designated generally by the numeral 10 and comprising a fuselage 12 having a cock-pit 14 in the forward portion thereof and a rotor blade mounting center post 16 rising therefrom rearwardly of the cock-pit. To the upper end of the center post 16 is attached a housing 18 revolvable about the center post 16 and within which the inner ends of the rotor blades are journalled for limited rotation about their own axes.

Extending longitudinally through each of the blades 20 are a pair of jet fluid tubes on lines 22 and 24 respectively which terminate in outer end sections 26 and 28 respectively which project rearwardly from the trailing edge of each blade. Section 28 is coplanar with the axis 29 of blade rotation so that any thrust delivered to the blade from a stream issuing from tube section 28 is applied wholly to the blade in such direction as to aid in revolving the rotor. Section 26 is laterally spaced from the axis 29 of rotation so that the thrust delivered from section 26 has a force component tending to rotate the blade about axis 29. Three-way valve means 30 in each blade connect the inner ends of the jet fluid lines 22 and 24 of each blade to one another, each valve means 30 operating to control the passage of fluid wholly through either of blades 22 and 24 or simultaneously in varying proportions to both of the lines.

Each of the valve means 30 is provided with an operating valve stem 32 projecting outwardly and downwardly from the inner end portion of each blade 20 adjacent the center post 16. The lower end of each valve stem is bifurcated as at 34, and pin 36 extending through each of the furcations of each valve stem 32 rotatably journals a roller or wheel 38 to the free end of the valve stem. Sleeve 40 is slidably mounted on post 16 adjacent to its upper end.

Projecting outwardly from the center post below the sleeve 40 is a supporting bracket 42 to the free end of which is pivotally attached an operating lever 44. As will be noted particularly in Figure 4, the operating lever 44 is pivotally attached by means of pin 46 to the bracket 42 intermediate its ends, the inner end of the lever being bifurcated as at 48, this bifurcated end being slidably pivotally received by radially outwardly projecting pin 50 on the sleeve 40. The outer end of the lever 44 has pivotally connected thereto the upper end of a control rod 52 which terminates at the cock-pit 14 on the helicopter. By virtue of the particular mounting of the lever 44 of the center post 16 and its connection with the sleeve 40, it is obvious that the sliding movement of the sleeve will be limited by the degree of movement permitted the lever 44 and its sliding pivot connection to the sleeve 40.

A flat ring 54 surrounds post 16, and is carried by a saddle member or yoke 56. Yoke 56 has its outer end portions 58 received between ears 60 depending from the undersurface of the ring 54 at diametrically opposite sides thereof. Pin 62 extending between each pair of ears 60, pivotally attaches the ring to the outer end of the saddle member 56. Intermediate its ends, the saddle bearing or yoke 56 is formed with an eye member 64 which surrounds the sleeve 40. Pins 66 pivotally mount the saddle bearing 56 on the sleeve 40, these pins extending from diametrically opposite sides of the sleeve 40 and through diametrically opposite sides of the eye member 64 forming a portion of the saddle bearing 56. With this attachment of the saddle bearing 56 to the sleeve 40 and the ring member 64, the ring member is capable of universal movement about the axis formed by the pins 66 or the axis formed by the pins 62. The rollers 38 of the valve stems 32 engage the upper surface of the ring 54 at diametrically opposite sides thereof.

Control rod 68 which is fixed to ring 54 extends downwardly from one end of the ring 54 and terminates in the cockpit 14.

Pressurized fluid from a suitable generator or storage tank within fuselage 12 of the machine delivers fluid under pressure through the fluid line 70 in the hollow center post 16 to the valve means 30 from which the fluid is distributed through lines 22 and 24 to drive the rotor blades 20. The outer end section 26 of each jet tube 22 is tilted upwardly as well as being spaced from the axis 29 of blade rotation.

Assuming the machine is running with the valve means 30 set to supply all of the jet fluid to line 24 of each blade, if ring 54 is tilted, it will cause the valve means 30 to distribute a part or all of the jet fluid through lines 22 at any particular point, thus reducing the angle of attack of the blades at this point and thereby reducing the lift of the blade at that point and prividing an excellent method for achieving forward, backward or sideward progress of the machine.

When it is desired to revolve the blades at full power without these blades biting into the air, the control rod 52 is pulled downwardly lifting the sleeve 40 upwardly to the greatest extent thereby causing the valve means 30 to distribute all of the jet fluid through the lines 24 of the blades. Obviously, with this actuation without any actuation of the control means 68, the ring 54 will rise on a substantially even horizontal plane so that no variation in the angle of attack of the blades to the air will be occasioned. However, when it is desired to distribute a portion of the fluid through the lines 22 at any particular point, the control rod 68 is operated to tilt the ring member 54 to operate the valve stems 32 as previously noted.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A center post, a pair of helicopter blades extending radially outwardly from the post, a pair of fluid lines extending longitudinally through each blade and having outer end portions projecting rearwardly through the trailing edge adjacent the tip thereof for imparting rotation to the blade upon the passage of fluid under pressure therethrough, the outer end portion of one of said lines being angled relative to the chord plane of the blade, valve means at the inner ends of each pair of fluid lines, valve control means operatively carried by said center post for selectively and simultaneously opening the fluid lines to fluid passage in either or both of said blades for controlling the thrust and the pitch of the blades.

2. A center post, a pair of helicopter blades extending radially outwardly from the post, a pair of fluid lines extending longitudinally through each blade and having outer end portions projecting rearwardly through the trailing edge adjacent the tip thereof for imparting rotation to the blade upon the passage of fluid under pressure therethrough, the outer end portion of one of said lines being angled relative to the chord plane of the blade, valve means at the inner ends of each pair of fluid lines, valve control means operatively carried by said center post for selectively and simultaneously opening the fluid lines to fluid passage in either or both of said blades, said blades being mounted for limited rotational movement on said center post, the angle of incidence of the blades being varied in response to the relative amount of fluid admitted to each fluid line by said valve means.

3. A center post, a pair of helicopter blades extending radially outwardly from the post, a pair of fluid lines extending longitudinally through each blade and having outer end portions projecting rearwardly through the trailing edge adjacent the tip therof for imparting rotation to the blade upon the passage of fluid under pressure therethrough, the outer end portion of one of said lines being angled relative to the chord plane of the blade, valve means at the inner ends of each pair of fluid lines, valve control means operatively carried by said center post for selectively and simultaneously opening the fluid lines to fluid passage in either or both of said blades for controlling the thrust and the pitch of the blades, said valve operating means comprising a flat ring concentrically surrounding said center post and being attached for universal movement relative to said center post, valve stems extending from said valve means engaging said ring and being movable in response to movement thereof.

4. A center post, a pair of helicopter blades extending radially outwardly from the post, a pair of fluid lines extending longitudinally through each blade and having outer end portions projecting rearwardly through the trailing edge adjacent the tip thereof for imparting rotation to the blade upon the passage of fluid under pressure therethrough, the outer end portion of one of said lines being angled relative to the chord plane of the blade, valve means at the inner ends of each pair of fluid lines, valve control means operatively carried by said center post for selectively and simultaneously opening the fluid lines to fluid passage in either or both of said blades for controlling the thrust and the pitch of the blades, said valve operating means comprising a flat ring concentrically surrounding said center post and being attached for universal movement relative to said center post, valve stems extending from said valve means engaging said ring and being movable in response to movement thereof, a sleeve slidably disposed on said center post, said ring being mounted on said sleeve, control rods from said ring and sleeve for moving the same.

5. In a helicopter, a fuselage, a center post rising from said fuselage, helicopter blades carried rotatably at the upper end of said center post and extending radially outward therefrom, means journalling said blades for limited rotational movement about their axes, jet tubes projecting rearwardly from the trailing edges of said blades adjacent the outer ends thereof for driving the blades, valve means for controlling fluid passage through said jet tubes in each blade, valve operating means operable from said fuselage to individually and simultaneously operate the valve means for each blade, one of the jet tubes of each blade being angled upwardly from the chord plane of the blade whereby passage of fluid therethrough will rotate the blade about its axis to selectively elevate and turn the helicopter.

6. In a helicopter, a fuselage, a center post rising from said fuselage, helicopter blades carried rotatably at the upper end of said center post and extending radially outward therefrom, means journaling said blades for limited rotational movement about their axes, jet tubes projecting rearwardly from the trailing edges of said blades adjacent the outer ends thereof for driving the blades, valve means for controlling fluid passage through said jet tubes in each blade, valve operating means operable from said fuselage to individually and simultaneously operate the valve means for each blade, one of the jet tubes of each blade being angled upwardly from the chord plane of the blade whereby passage of fluid therethrough will rotate the blade about its axis to selectively elevate and turn the helicopter, said control means including a sleeve slidably carried by said center post, a ring carried by said sleeve in surrounding relation thereto, valve operating stems from said valve means engaging said ring, means for moving said ring and sleeve to operate said valve stems.

7. In a helicopter, a fuselage, a center post rising from said fuselage, helicopter blades carried rotatably at the upper end of said center post and extending radially outward therefrom, means journaling said blades for limited rotational movement about their axes, jet tubes projecting rearwardly from the trailing edges of said blades adjacent the outer ends thereof for driving the blades, valve means for controlling fluid passage through said jet tubes in each blade, valve operating means operable from said fuselage to individually and simultaneously operate the valve means for each blade, one of the jet tubes of each blade being angled upwardly from the chord plane of the blade whereby passage of fluid therethrough will rotate the blade about its axis to selectively elevate and turn the helicopter, said control means including a sleeve slidably carried by said center post, a ring carried by said sleeve in surrounding relation thereto, valve operating stems from said valve means engaging said ring, means for moving said ring and sleeve to operate said valve stems, a yoke carrying said ring on said sleeve, said yoke including a pair of diametrically extending arms joined at their inner ends by an eye forming portion surrounding said sleeve, said eye forming portion being pivotally attached to said sleeve, said ring being pivotally mounted on the outer ends of said arms for movement about an axis perpendicular to the pivoting axis of the yoke on the sleeve.

8. In a helicopter, a fuselage, a center post rising from said fuselage, helicopter blades carried rotatably at the upper end of said center post and extending radially outward therefrom, means journaling said blades for limited rotational movement about their axes, jet tubes projecting rearwardly from the trailing edges of said blades adjacent the outer ends thereof for driving the blades, valve means for controlling fluid passage through said jet tubes in each blade, valve operating means operable from said fuselage to individually and simultaneously operate the valve means for each blade, one of the jet tubes of each blade being angled upwardly from the chord plane of the blade whereby passage of fluid therethrough will rotate the blade about its axis to selectively elevate and turn the helicopter, said control means including a sleeve slidably carried by said center post, a ring carried by said sleeve in surrounding relation thereto, valve operating stems from said valve means engaging said ring, means for moving said ring and sleeve to operate said valve stems, a yoke carrying said ring on said sleeve, said yoke including a pair of diametrically extending arms joined at their inner ends by an eye forming portion surrounding said sleeve, said eye forming portion being pivotally attached to said sleeve, said ring being pivotally mounted on the outer ends of said arms for movement about an axis perpendicular to the pivoting axis of the yoke on the sleeve, and control rods connected to said sleeve and said ring for operating the same from the helicopter fuselage.

9. The combination of claim 8 wherein a bracket is mounted on said center post and extends laterally outward therefrom, a lever pivoted intermediate its ends on said bracket, the inner end of said lever being slidingly pivoted to said sleeve, the sleeve control rod being pivoted to the outer end of said lever.

10. In a helicopter rotor having a post and blades extending laterally therefrom, a pitch control assembly for said blades, said assembly including jet tubes at the trailing edges of said blades and directed rearwardly thereof, means connected to said tubes and including a valve for controlling the passage of fluid through said jet tubes, and pilot controllable means operatively connected with said valve for actuating said valve, at least one of said jet tubes being angled with respect to the chord plane of the rotor blades so that when fluid issues from said jet tubes said blades are twisted to provide helicopter control forces.

11. In a helicopter rotor having a post to which rotor blades are connected, and a tiltable control ring for adjusting the pitch of the blades, the improvement comprising jet tubes supported by each blade and arranged to issue jet streams rearwardly of their supporting blade, means including a valve for supplying fluid to said jet tubes, at least one of said jet tubes being laterally spaced from the rotor chord plane to provide pitch control forces for said rotor blade, and means operatively connected with said control ring for actuating said valve in response to the positions of said control ring.

12. In a helicopter rotor that has a post to which rotor blades are connected, the improvement comprising a pitch control assembly for the rotor blades and including a jet tube carried by each blade and discharging rearwardly of each blade, said jet tube directing its stream at an angle to the chord plane of the rotor blades to provide twisting forces to said blades for pitch control thereof, and means for controlling the passage of fluid through said jet tubes.

13. In a helicopter rotor having a hub with blades which are mounted for rotative pitch adjustment about their longitudinal axes, a blade pitch control and propulsion assembly for each of the blades, said assembly including for each blade a pair of spaced jet tubes directed downstream of its blade, a control valve for controlling the flow of fluid through said jet tubes to thereby control the amount of thrust delivered by each tube, and one of said tubes being arranged with its line of thrust laterally spaced from said longitudinal axis of its blade so that there is a thrust component directed to rotate said blade and thereby change its pitch adjustment.

14. In a helicopter rotor having a hub with blades which are mounted for rotative pitch adjustment about their longitudinal axes, a blade pitch control and propulsion assembly for each of the blades, said assembly including for each blade a pair of spaced jet tubes directed downstream of its blade, a control valve for controlling the flow of fluid through said jet tubes to thereby control the amount of thrust delivered by each tube, one of said tubes being arranged with its line of thrust laterally spaced from said longitudinal axes of its blade so that there is a thrust component directed to rotate said blade and thereby change its pitch adjustment, and the other of said jet tubes having its line of thrust in the chord plane of said blade so that nominally all of the thrust delivered therefrom is applied to the blade in a direction to rotate the rotor.

References Cited in the file of this patent
UNITED STATES PATENTS

| 2,428,200 | Campbell | Sept. 30, 1947 |
| 2,689,011 | Zakhartchenko | Sept. 14, 1954 |